June 12, 1951  J. W. STARBUCK  2,556,230
GAUGE FOR ROUND HATS
Filed Feb. 3, 1945
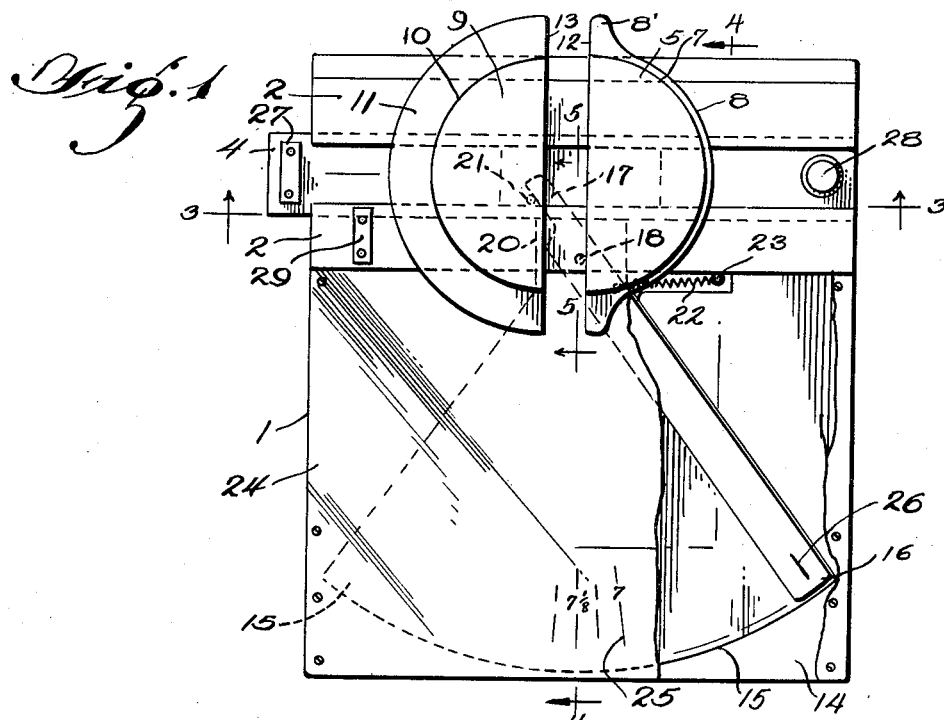
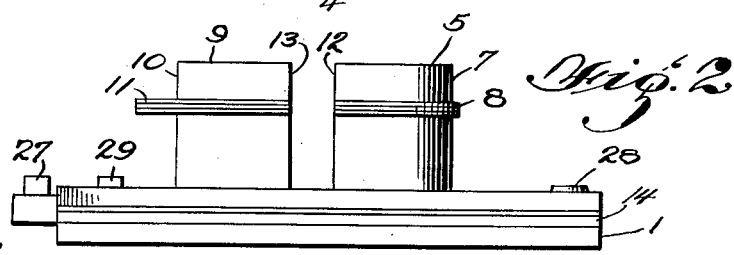
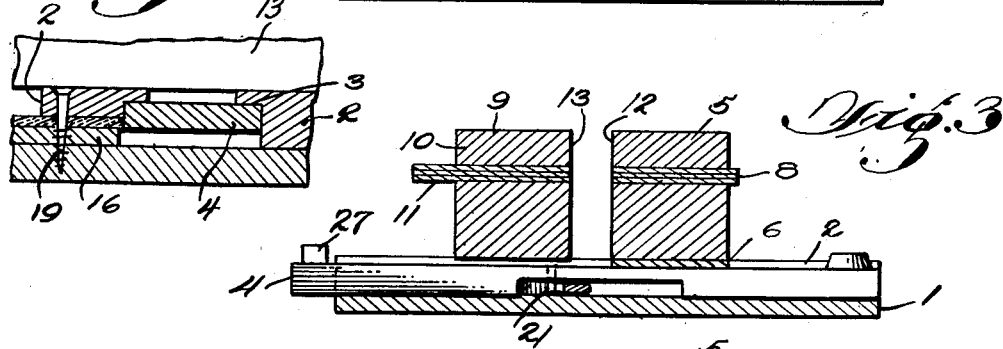
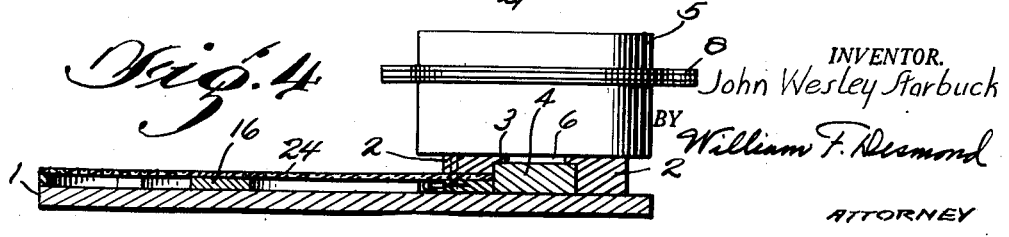
INVENTOR.
John Wesley Starbuck
BY William F. Desmond
ATTORNEY Patented June 12, 1951

2,556,230

UNITED STATES PATENT OFFICE 2,556,230

GAUGE FOR ROUND HATS

John W. Starbuck, New York, N. Y.

Application February 3, 1945, Serial No. 576,101

3 Claims. (Cl. 33—178)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to hat gages and, more particularly, to gages for measuring the head sizes of hats, caps, or the like, and has for its chief objects the provision of an instrument of the type named which is of simple and rugged construction, accurate and efficient in the performance of its intended functions, and easily and quickly manipulated.

With the above and other objects in view, the invention consists of the novel features of construction, mode of operation, and combination of parts described in the following specification and illustrated in the accompanying drawings, and particularly pointed out in the appended claims.

In the drawings:

Figure 1 is a plan view of the gage; Figure 2 is an end elevational view of the same; Figure 3 is a transverse section through the gage taken along the line 3—3 of Figure 1, looking in the direction indicated by the arrows; Figure 4 is a longitudinal section through the gage taken along the line 4—4 of Figure 1, looking in the direction of the arrows, and Figure 5 is a section taken along line 5—5 of Figure 1, looking in the direction of the arrows, and showing the arrangement and relation of the guides, the pointer and the operating means therefor.

Referring in detail to the drawing, the gage is provided with a base member 1, which may be of any suitable material and has a generally rectangular outline with rounded corners. A pair of guides 2, 2 are secured to the base member 1 in spaced-apart relationship. The guides 2, 2 are undercut, as indicated at 3, to form grooves for the sliding reception of a slide 4 whose length is slightly greater than the width of the base member 1. A sliding block 5 is secured to slide 4 with the interposition of a filler piece 6, seen in Figure 3, between said block and slide so that the block rests upon the top surface of the guides 2, 2 for sliding movement therealong, and the slide is held in a position spaced from the base member 1. The block 5 has a rounded face 7 provided with a rim 8 projecting therefrom, for a purpose later to be explained. A fixed block 9 is secured to the top surface of the guides 2, 2 in opposed relationship to the sliding block 5. The fixed block 9 has a rounded surface 10 from which projects the rim 11. The sliding block 5 and fixed block 9 have the flat opposed surfaces 12 and 13 respectively. The rounded surfaces 7 and 10 together form a cylinder and are adapted to engage opposite interior portions of a hat whose size is to be measured.

A member 14, which may be of any suitable material, is secured to the base 1 and has a sector-shaped cut-out portion 15, as shown in Figure 1, forming a cavity in which a pointer 16 is adapted to move. The pointer 16 is in the form of a flat bar, having a reduced end portion 17 and a hole 18 for the reception of a nail 19, acting as a pivot.

A cavity 20 is formed in the lower surface of one of the guides 2, 2 adjacent to and forming a continuation of the cavity 15. The pointer 16 is pivoted within the cavity 20 and the reduced end portion 17 of the pointer engages a pointer activating pin 21, projecting downwardly from the bottom of the slide 4 so that a sliding movement of the slide 4 causes a pivotal movement of the pointer.

A spring or the like 22 has one end secured by a screw eye 23 to one of the guides 2, 2 and its other end secured to the pointer 16, so that the pivotal movement of the pointer, caused by the engagement of the reduced end portion 17 thereof with the pin 21, is opposed by the spring 22.

A plate 24 of transparent material such as Lucite is fixed over the member 14 covering the cavity 15. This plate 24 bears the scale markings 25 thereon, graduated to indicate hat sizes. The pointer 16 has the mark 26 thereon for indicating its position with relation to the scale markings 25.

Finger grips 27, 28 are provided on the slide 4 and a finger grip 29 is provided on one of the guides 2, 2, as seen in Figure 1, whereby the slide 4 may be moved to any position which it is capable of assuming.

In the initial condition of the instrument, before it is put into use, the slide 4 and the pointer 16 will normally lie in the positions shown in Figure 1, to which positions they are brought by the action of the spring 22 causing the reduced end portion 17 of the pointer 16 to engage the pin 21 of the slide. In this condition, the instrument is in its fully closed or retracted position.

In order to use the instrument, it is only necessary to place a hat, cap, or the like, over the blocks 5 and 9 resting upon the rim portions 8 and 11 thereof, and to move the slide 4 by use of the finger grips 27 and 29, or 28, and therewith the block 5, until the rounded surfaces 7 and 10 are pressed firmly against the inside surface of the band of the hat. The movement of the slide 4, by reason of the engagement of the pin 21 thereon with the reduced end portion 17 of the pointer 16, moves the pointer to a position from which the size of the hat is indicated by the relation of the mark 26 on the pointer 16 to the scale markings 25 on the transparent plate 24. Upon releasing the finger grips 27 and 29, or 28, the spring 22 causes the return of the parts of the instrument to their initial positions, as indicated in Figure 1, and the hat can be removed therefrom.

It will be noted that the rim 11 of the fixed block 9 is of a width greater than that of the rim 8 of the movable block 5, and that the rim 8 has ears 8' at opposite sides of the movable block 5 which are of a width corresponding to that of the rim 11. The wide rim 11 and the wide portions 8' of the rim 8 are provided to form a substantial support for a hat to rest upon when placed over the blocks 5 and 9, while rim 8 is made narrow to facilitate the positioning and removal of the hats on the gage without interference with any of its parts. While the instrument, as shown in Figure 1, is most easily used by placing the hats over the blocks with the right hand, and manipulating the slide 4 with the left hand, it can also be operated in the reverse manner without difficulty.

It will thus be apparent that the invention as described above provides a simple gage of rugged construction, having no complicated parts likely to get out of order, and by means of which the sizes of hats of all kinds can be quickly and easily determined.

Having thus clearly described and illustrated the invention, what is claimed and desired to secure by Letters Patent is:

1. A device for measuring the sizes of hats, caps, or the like, comprising a base plate, a second plate mounted thereon and provided with a sector-shaped cut-out portion extending therethrough, a pair of guide members provided with correlated undercut portions and mounted transversely of the base plate in spaced apart relationship at a point adjacent the vertex of the sector-shaped cut-out portion, a manually operable slide mounted on said base with its edges located in the spaces provided by the undercut portions, a substantially semi-cylindrical hat or cap-engaging block fixed to the base, a complemental substantially semi-cylindrical hat or cap-engaging block fixed to the slide, a pivotally-mounted pointer located in the sector-shaped cut-out and having one end operatively connected with said slide, and spring means for normally maintaining said slide and the hat-engaging block mounted thereon in retracted position.

2. A device for measuring the sizes of hats, caps, or the like, comprising a base plate, a second plate mounted thereon and provided with a sector-shaped cut-out portion extending therethrough, a pair of guide members mounted on the base plate in spaced apart relationship and provided with correlated undercut portions, a manually operable slide mounted on said base with its edges located in the spaces provided by the undercut portions, a substantially semi-cylindrical hat or cap engaging block fixed to the base, a complemental substantially semi-cylindrical hat or cap-engaging block fixed to the slide, a pivotally-mounted pointer located in the sector-shaped cut-out and having one end operatively connected with said slide, spring means for normally maintaining said slide and the hat-engaging block mounted thereon in retracted position, and a transparent member secured to the upper surface of the second-mentioned plate and extending over the sector-shaped cut-out portion and pointer.

3. A device for measuring the sizes of hats, caps, or the like, comprising a base plate, a second plate mounted thereon and provided with a sector-shaped cut-out portion extending therethrough, a pair of guide members mounted on the base plate in spaced apart relationship and provided with correlated undercut portions, a manually operable slide mounted on said base with its edges located in the spaces provided by the undercut portions, a substantially semi-cylindrical hat or cap-engaging block fixed to the base, a complemental substantially semi-cylindrical hat or cap-engaging block fixed to the slide, a wide rim projecting from one of said blocks, a narrow rim projecting from the other block to cooperate with the first-mentioned rim in supporting a hat or cap, a pivotally-mounted pointer located in the sector-shaped cut-out and having one end operatively connected with said slide, and spring means for normally maintaining said slide and the hat-engaging block mounted thereon in retracted position.

JOHN W. STARBUCK.

REFERENCES CITED

The following references are of record in the file of this patent:

UNITED STATES PATENTS

| Number | Name | Date |
| --- | --- | --- |
| 236,283 | Lamont | Jan. 4, 1881 |
| 1,210,557 | Stanbery | Jan. 2, 1917 |
| 1,325,943 | Howard | Dec. 23, 1919 |
| 1,625,462 | Frauenthal | Apr. 19, 1927 |
| 1,932,682 | Berkley | Oct. 31, 1933 |

FOREIGN PATENTS

| Number | Country | Date |
| --- | --- | --- |
| 307,954 | Germany | Sept. 25, 1918 |